United States Patent [19]

Murakami et al.

[11] Patent Number: 4,583,394
[45] Date of Patent: Apr. 22, 1986

[54] DEVICE AND METHOD FOR LEAK LOCATION

[75] Inventors: Yoshio Murakami, Mito; Kenjiroh Obara, Nakamachi; Tetsuya Abe, Tohkaimura; Yasuo Shimomura, Mito; Takemasa Shibata, Tohkaimura, all of Japan

[73] Assignee: Japan Atomic Energy Research Institute, Tokyo, Japan

[21] Appl. No.: 638,421

[22] Filed: Aug. 7, 1984

[51] Int. Cl.[4] .............................................. G01M 3/22
[52] U.S. Cl. ....................................................... 73/40.7
[58] Field of Search ........................................ 73/40.7

[56] References Cited

U.S. PATENT DOCUMENTS

| | | | |
|---|---|---|---|
| 3,798,536 | 3/1974 | Maillard et al. | 73/40.7 X |
| 3,855,844 | 12/1974 | Craig | 73/40.7 |
| 3,888,111 | 6/1975 | Craig | 73/40.7 |
| 4,232,546 | 11/1980 | Dumont | 73/40.7 |
| 4,409,817 | 10/1983 | Edwards, Jr. | 73/40.7 |
| 4,459,844 | 7/1984 | Burkhart | 73/40.7 |

Primary Examiner—S. Clement Swisher
Assistant Examiner—Joseph W. Roskos
Attorney, Agent, or Firm—Schwartz & Weinrieb

[57] ABSTRACT

A method and apparatus are disclosed for detecting the presence of very fine leaks through the walls of an enclosure which include a sniffer nozzle (1) open to the atmosphere, a vessel (5) having molecular sieves (4) therein for adsorbing substantially all gaseous products which have entered the sniffer nozzle (1) with the exception of the probe gas which has been pressurized within the enclosure being tested, a pump system (8, 9) for creating vacuum conditions within the system, a mass spectrometer (12) for detecting the presence of the probe gas, and a capillary tube (2) interconnecting the nozzle sniffer (1) and the molecular sieve assembly whereby the probe gas draw rate, and sensitivity of the apparatus of the present invention, are significantly increased.

20 Claims, 4 Drawing Figures

DEVICE AND METHOD FOR LEAK LOCATION

FIELD OF THE INVENTION

The present invention relates to a device and method for leak location. More particularly, the present invention relates to a device for locating very fine leaks used for a leak detecting test of airtight vessel, tubing, or the like, and further particularly, relates to such a type of an high sensitive device for locating very fine leaks that a probe gas is pressure charged into the interior of vessel to be tested and probe gas flowing out from a leak spot to the atmosphere is inhaled with air through a probe nozzle (sniffer) and detected.

BACKGROUND OF THE INVENTION

Recently, vacuum apparatus for a fusion reactor, accelerator, or the like, have grown continuously larger in size and have become quite complicated in structure. Welding techniques and sealing techniques by means of a metal gasket, or the like, in the manufacture of a vacuum vessel have made remarkable progress, however it is very difficult under the present conditions to completely remove leaks so that a leak detection test is now an indispensable step in the process of manufacturing a vacuum vessel. And also, after the completion of the apparatus, leaks often occur due to stress fatigue or corrosion of the material. Accordingly, it is necessary to carry out a leak detection test of large-sized and completely shaped apparatus in-situ under variously restricted conditions.

These leak detection tests must be able to specify a leak portion to several square centimeters of area or several centimeters of length, since the tests are premised on repair or exchange of leak location sections. This is comparatively simple in a small type of vacuum vessel, however, since, in the case of a large type of vacuum vessel, many hours and a great deal of labor are required, it is very important to improve this efficiency.

In the case of locating a very fine leak as below $10^{-15}$ Torr. 1/s ($\sim 10^{-5}$ cm$^3$ (NTP)/s), a probe gas is usually employed. The probe gas method is classified roughly into an internal vacuum method and an interal pressure method. The former is to evacuate the interior of vacuum vessel to be tested by means of a vacuum pump and spray a probe gas, for example helium, partially onto the outside of the vessel to detect a leak spot, whereby the probe gas sprayed upon a leak portion flows into the interior of the vessel through the leak depending on the size of the leak and a detector, for example, a helium leak detector fitted on the vacuum vessel, acts thereupon. The latter, in contrast with the former, is to charge a probe gas, at a level of several atmospheric pressures, into the interior of the vacuum vessel to be tested and to inhale a probe gas flowing out from the vessel at the leak spot to the atmosphere with air through a probe nozzle (sniffer) and detect it. Each of the aforenoted methods has its merits and demerits. Particularly, in the case of applying the internal vacuum method to the leak detection test of large-sized apparatus, the equipment for vacuum evacuation, or the like are not only increased but also there is the problem of taking a lot of time required to start the test. On the other hand, the internal pressure (sniffer) method is simple and can be easily used independent of the size of the apparatus to be tested, but is comparatively lower in sensitivity so that the detection of very fine leaks, such as those below $10^{-7}$ Torr. 1/s ($\sim 10^{-7}$ cm$^3$ (NTP)/s), is difficult.

As a result of researching the improvement of sensitivity in the internal pressure (sniffer) method in view of such point, the present inventors have found that the sensitivity can be elevated by about 10000 times than the conventional internal pressure (sniffer) method by using any one of helium, neon and hydrogen as a probe gas inserting a long capillary tube for keeping a flow rate constant, and using a vessel filled with a porous adsorbent which is cooled to a temperature below the liquid air temperature in series between a probe nozzle (sniffer) and a probe gas detector.

SUMMARY OF THE INVENTION

The present invention has been accomplished on the basis of this knowledge, and an object of the present invention is to provide a device for locating very fine leaks, which is simple in construction, can be easily used and by which it is possible to locate a very fine leak such as $10^{-10}$ Torr. 1/ s ($\sim 10^{-10}$ cm$^3$ (NTP)/s).

Various other objects, features, and attendant advantages of the present invention will become better understood, when considered in connection with the accompanying drawings, wherein like or corresponding parts have been denoted by similar reference characters in the various views, and wherein:

DETAILED DESCRIPTION OF THE PREFERRED EMBODIMENT

Figure 1:
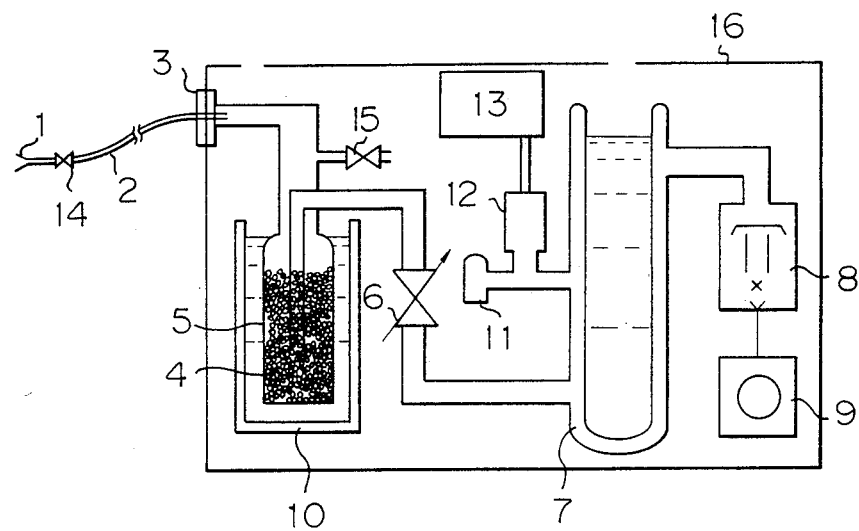
FIG. 1 shows schematically an embodiment of the device for locating very fine leaks of the present invention.

The device for locating very fine leaks of the present invention is such a device that a probe gas, at a level of several atmospheric pressures, such as helium, is charged into the interior of a large-sized vacuum vessel and the like to be tested and then the probe gas, which is effused to the atmosphere through a leak portion is inhaled with air through a probe nozzle and detected, and is generally constituted as follows:

For example, as shown in FIG. 1, a flexible capillary tube 2 of about 0.6 mm in inner diameter, about 1.1 mm in outer diameter and 10 m in length, and made of stainless steel, is connected to a probe nozzle (sniffer) 1 open to the atmosphere and is also connected to one end of a vessel 5 filled with molecular sieves 4 by a flange 3 and another end of said vessel 5 is connected to a diffusion pump 8 by a pipe of about 20~50 mm in inner diameter through a slot valve 6 and a liquid nitrogen cooling trap 7 and then said diffusion pump 8 is connected to an oil rotary pump 9. The vessel 5 filled with molecular sieves 4 is cooled with liquid nitrogen in a thermos bottle 10, and a total pressure gage 11 and a mass spectrometer tube 12 adjusted to act only upon a probe gas of helium, or the like, are arranged near the cooling trap 7. 13 illustrates electronic equipment for indicating partial pressure of the probe gas in the mass spectrometer tube on a meter or recorder.

In addition, 14 is an on-off valve, 15 is a safety valve which opens automatically with an extensive rise of pressure within the vessel 5 and 16 is a housing containing the main potion of the present device for locationg leaks.

Figure 2:
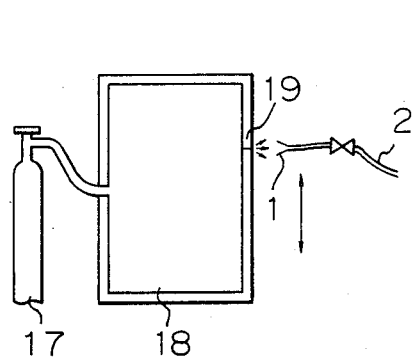
FIG. 2 is a schematic diagram showing the method of locating very fine leaks in an embodiment, in which 17 is a probe gas container, 18 is a vessel to be tested and 19 shows a leak portion.

Generally the air is inhaled from the probe nozzle (sniffer) 1, but, when the end of the nozzle comes near a spot where a leak of probe gas occurs, as shown in FIG. 2, a portion of the leaked probe gas is inhaled together with the air. The capillary tube 2 is of use for keeping the flow rate of air inhaled constant and moving the probe nozzle freely. In case of this embodiment, the flow rate of air inhaled is approximately 0.6 Torr. 1/s (0.8 cm$^3$ (NTP)/s). Most of the gas, except the helium, neon or hydrogen, which is inhaled and reaches the vessel 5 filled with molecular sieves is adsorbed thereby, with the helium or the like being exhausted. That is, almost 100% of helium, neon or hydrogen passes through the vessel 5 to reach the liquid nitrogen cooling trap 7 and the diffusion pump 8, but the main component of air, such as oxygen, nitrogen, or the like, is below 1%. As a result, the concentration of the probe gas is relatively elevated in the mass spectrometer tube and the sensitivity is elevated by about 100 times as compared with the case of not using the vessel 5. The time in which the probe gas reaches the mass spectrometer tube 12 from the probe nozzle is an important factor for determining the moving velocity (locating velocity) of the probe nozzle. In this embodiment, the time of the inhaled gas passing through the capillary tube 2 is approximate 2 seconds and the time of reaching the mass spectrometer tube 12 from the vessel 5 is approximately 5 seconds, so that the total time is approximate 8 seconds. Practically, such a time delay is out of the question.

Figure 4:
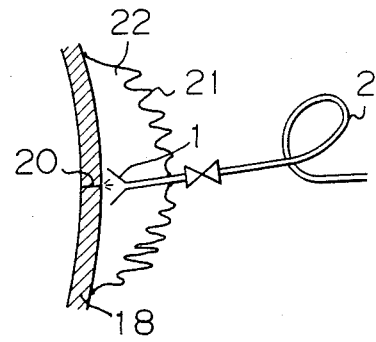
FIG. 4 is a schematic diagram showing the method of locating very fine leaks in another embodiment, in which 18 is a vessel to be tested, 20 shows a leak portion, 21 is a polyethylene bag and 22 shows a nitrogen gas charge.
Figure 3:
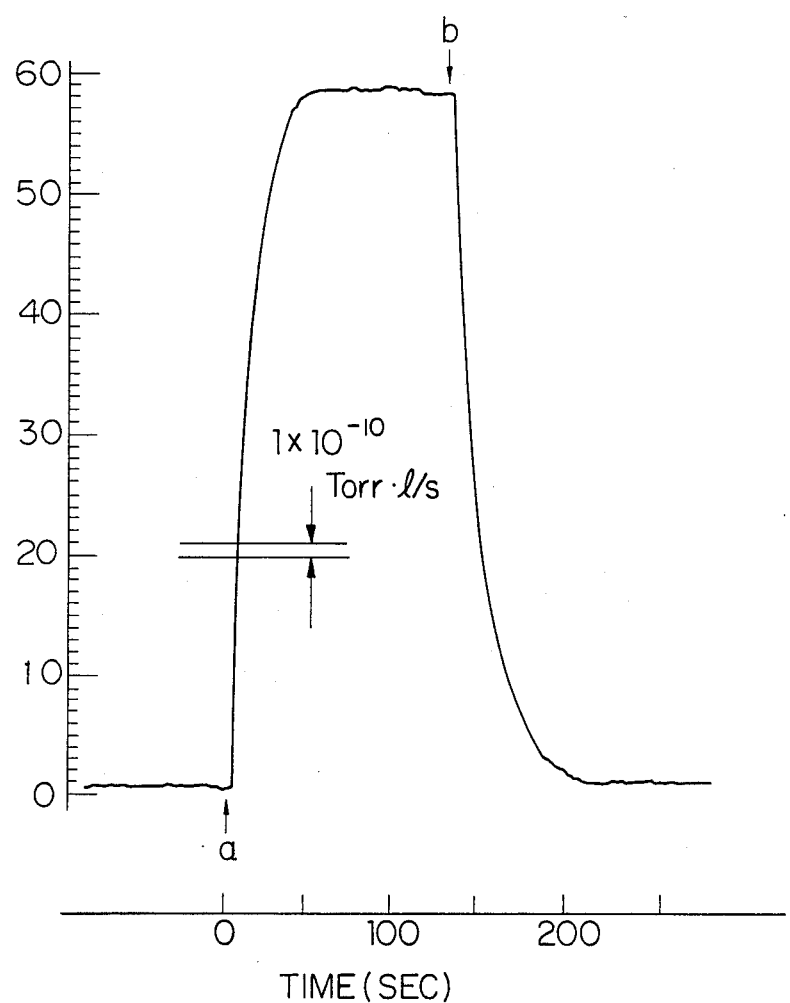
FIG. 3 is a graph showing the results of a measurement run using a known helium leak of $5.5 \times 10^{-9}$ Torr. 1/s in the present device.

FIG. 3 shows a measurement result of $5.5 \times 10^{-4}$ Torr. 1/s of a known helium leak using the present device. In this case, in order to reduce the affect of helium (approximate 5 ppm) existing in the air, the vessel to be tested was enclosed in a polyethylene bag and the air was purged by pure nitrogen, as shown in FIG. 4. It can be shown that, immediately after the probe nozzle is brought to a leak spot, the indication of the recorder increases, and when moving away from the spot it soon decreases. It is considered that, since the indication of the zero-point is stable and so the S/N ratio is good, the sensitivity of $10^{-10}$ Torr. 1/s ($\sim 10^{-10}$ cm$^3$ (NTP)/s) (corresponding to one scale on recording paper) can be sufficiently obtained.

Incidentally, in the conventional internal pressure method using a probe nozzle and a helium leak detector, the minimum content of detectable probe gas in the air taken in from the probe nozzle has been $0.1 \sim 10$ ppm. However, when using the present device, it has decreased by four figures as $0.1 \sim 10$ ppb. And also, in the conventional method, the flow rate of air necessary for inhaling a large rate of leak quantity into the probe nozzle has been a degree of $1 \times 10^{-4}$ Torr. 1/s ($\sim 10^{-4}$ cm$^3$(NTP)/s).

However, it can be increased by about 10000 times to a degree of 1 Torr. 1/s ($\sim 1$ cm$^3$(NTP)/s) by using the present device. Eventually, in the conventional internal pressure method, $1 \times 10^{-6}$ Torr. 1/s has been a practical limit of leak detection, however, according to the present invention, the detection of leak of $1 \times 10^{-10}$ Torr. 1/s has become possible. The present device has the above described excellent characteristics for the following three reasons:

1. To use a long flexible capillary tube:

In the conventional device, a portion of the nozzle has a very minute opening so that the processing precision of this portion and the operation have been very difficult. However, in the present device, the flow rate of gas inhaled has become stable by using a capillary tube and the leak detection operation has become very easy. The stabilization of the flow rate contributes to make the minimum content value of probe gas small by two figures as $10 \sim 100$ ppb;

2. To provide a vessel filled with a porous adsorbent cooled to a temperature below liquid air temperature between a capillary tube and a gas detector:

Since the porous adsorbent adsorbs selectively oxygen and nitrogen which are main components of the air, the concentration of probe gas in the detector portion is relatively elevated;

3. To design the device so as to utilize the property of gas flow at its maximum:

The flow rate of gas flowing in a capillary tube varies with the inner diameter and length of the capillary tube. Within the range in which the flow depends on the condition of viscous flow, the flow rate is in proportion to [inner diameter]$^4$/[length], however, it is desirable that this value is established within the range of $1 \sim 0.1$ Torr. 1/s, and the delay time of flow is in proportion to [length]$^2$/[inner diameter]$^2$. This value is desirably established within 5 seconds, and also it is necessary to make the Reynolds number of gas passing a flow path not exceed 1200. In order to satisfy all of these requirements the inner diameter must be below 0.75 mm.

Incidentally, in addition to molecular sieves, various active carbon, silica gel, or the like can be used as a porous adsorbent.

Obviously, many modifications and variations of the present invention are possible in light of the above teachings. It is therefore to be understood that within the scope of the appended claims, the present invention may be practiced otherwise than as specifically described herein.

What is claimed is:

1. A system for determining leaks through the walls of an enclosure which has been charged with a probe gas, comprising:

vacuum suction means for establishing a source of vacuum within said system;

means fluidically connected to said vacuum suction means for detecting the presence of said probe gas;

nozzle means open to the atmosphere for disposition outside of said enclosure walls so as to capture said probe gas leaking out from said enclosure through leak locations within said enclosure walls;

porous adsorbent means fluidically connected to said gas detecting means for adsorbing substantially all gaseous products which have entered said nozzle means yet permitting said probe gas to pass through said porous adsorbent means to said gas detecting means; and capillary tube means connected to said nozzle means and said porous adsorbent means for defining a high flow rate of said probe gas within said system whereby the sensitivity and leak detection efficiency of said system is able to be rendered high.

2. The system as set forth in claim 1 wherein said capillary tube is flexible.

3. The system as set forth in claim 1 wherein the inner diameter of said capillary tube is below 0.75 mm.

4. The system as set forth in claim 1 wherein said porous adsorbent is molecular sieves.

5. A system as set forth in claim 1, wherein:
said capillary tube is fabricated from stainless steel.

6. A system as set forth in claim 1, wherein:
said capillary tube is ten meters in length.

7. A system as set forth in claim 1, further comprising:
enclosure sealing means disposed about said capillary tube means and engaging the exterior surface of said enclosure wall of said enclosure being tested for said leak locations so as to enclose said nozzle means therewithin; and
inert atmospheric means defined within said enclosure sealing means.

8. A system as set forth in claim 7, wherein:
said enclosure sealing means comprises a polyethylene bag.

9. A system as set forth in claim 7, wherein:
said inert atmospheric means comprises pure nitrogen.

10. A system as set forth in claim 3, wherein:
said inside diameter of said capillary tube is 0.6 mm.

11. A system as set forth in claim 1, wherein:
said detecting means comprises a mass spectrometer.

12. A method of detecting leak locations within the walls of an enclosure structure, comprising the steps of:
charging the interior of said enclosure structure with a probe gas;
establishing a source of vacuum for inducing a fluid flow;
fluidically connecting a sniffer nozzle, open to the atmosphere, to said source of vacuum whereby an atmospheric fluid flow will be induced into said sniffer nozzle under the influence of said source of vacuum;
fluidically interposing a capillary tube between said sniffer nozzle and said source of vacuum whereby a high fluid flow rate will be induced through said sniffer nozzle and said capillary tube under the influence of said vacuum source;
interposing a probe gas detector between said capillary tube and said vacuum source;
interposing porous adsorbent means between said probe gas detector and said capillary tube for adsorbing substantially all gaseous products induced into said sniffer nozzle yet permitting said probe gas to pass through said adsorbent means to said probe gas detector; and
moving said sniffer nozzle along the outside wall surfaces of said enclosure structure for capturing any probe gas leaking out of said enclosure structure through a leak location thereof.

13. A method as set forth in claim 12, wherein:
said probe gas is helium.

14. A method as set forth in claim 12, wherein:
the inside diameter of said capillary tube is 0.60 mm.

15. A method as set forth in claim 12, wherein:
said capillary tube is fabricated from stainless steel.

16. A method as set forth in claim 12, wherein:
said probe gas detector is a mass spectrometer.

17. A method as set forth in claim 12, wherein:
said porous adsorbent comprises molecular sieves.

18. A method as set forth in claim 12, wherein:
said capillary tube has a length of ten meters.

19. A method as set forth in claim 12, additionally comprising the steps of:
enclosing said sniffer nozzle within an inert atmosphere.

20. A method as set forth in claim 19, wherein:
said inert atmosphere is pure nitrogen.

* * * * *